No. 641,943. Patented Jan. 23, 1900.
W. D. EASLEY.
CANE HEADER.
(Application filed Sept. 1, 1899.)
(No Model.) 3 Sheets—Sheet 1.
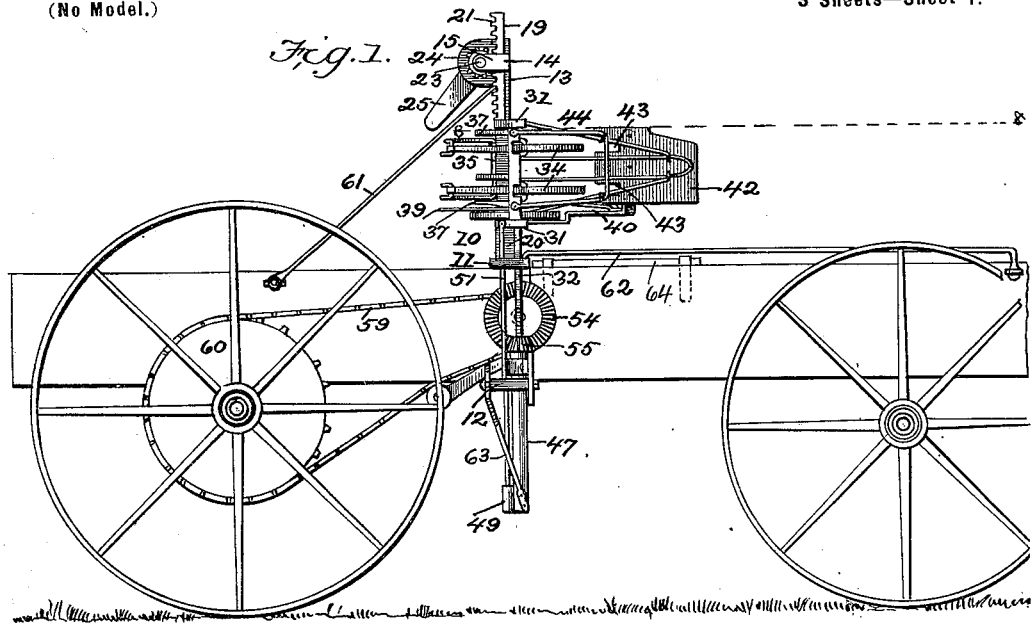
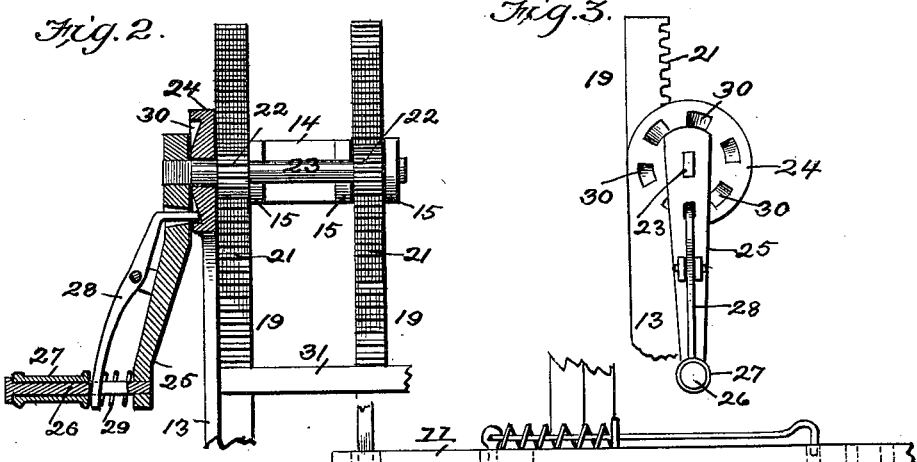
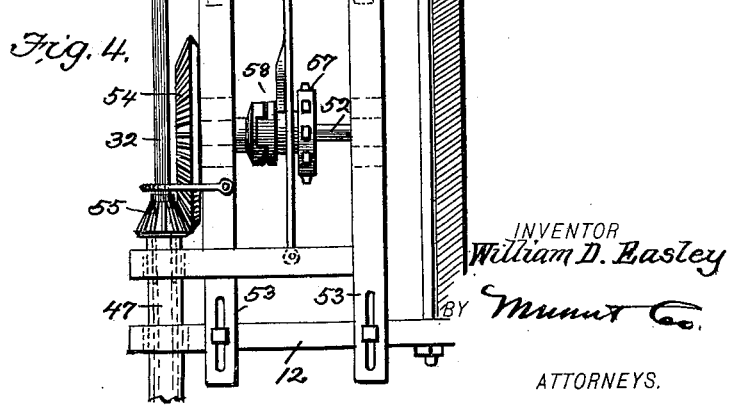
WITNESSES:
Jos. A. Ryan
F. J. Stitt
INVENTOR
William D. Easley
BY Munn & Co.
ATTORNEYS.

No. 641,943. Patented Jan. 23, 1900.
W. D. EASLEY.
CANE HEADER.
(Application filed Sept. 1, 1899.)
(No Model.) 3 Sheets—Sheet 2.
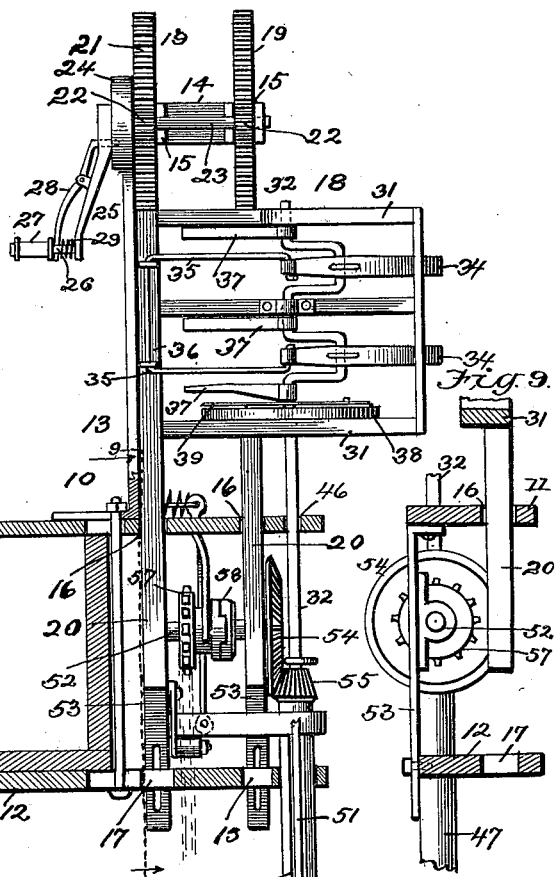
Fig. 5.
Fig. 9.
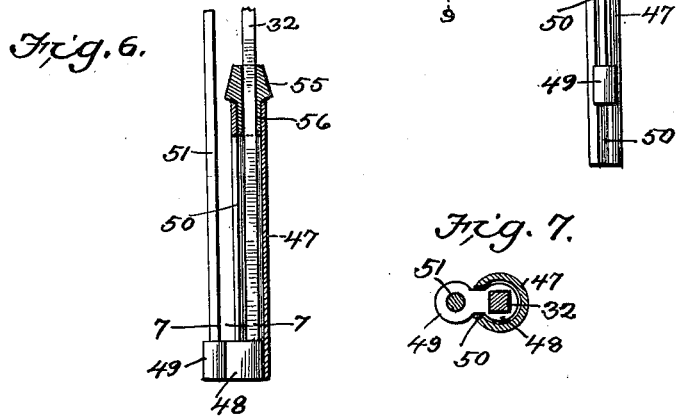
Fig. 6.
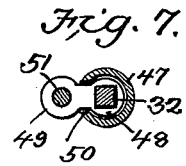
Fig. 7.
WITNESSES:
Jos. A. Ryan
F. L. Stitt
INVENTOR
William D. Easley.
BY Munn & Co.
ATTORNEYS.

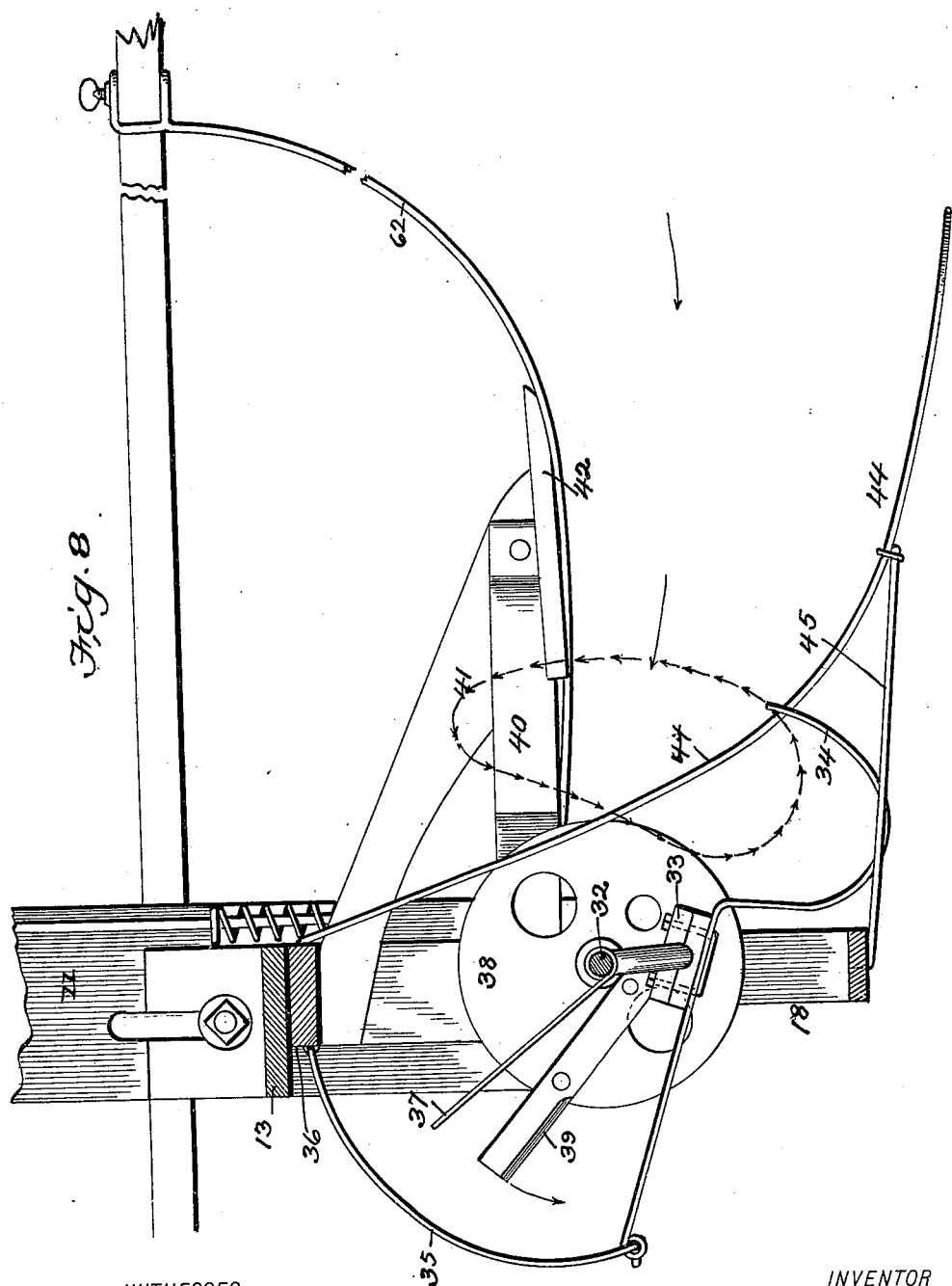

UNITED STATES PATENT OFFICE.

WILLIAM DUDLEY EASLEY, OF RINGGOLD, TEXAS.

CANE-HEADER.

SPECIFICATION forming part of Letters Patent No. 641,943, dated January 23, 1900.

Application filed September 1, 1899. Serial No. 729,228. (No model.)

*To all whom it may concern:*

Be it known that I, WILLIAM DUDLEY EASLEY, of Ringgold, in the county of Montague and State of Texas, have invented a new and useful Improvement in Cane-Headers, of which the following is a specification.

My invention is in the nature of an improvement in apparatus for cutting off the heads of cane, Kafir corn, or the like; and it has for its object a header which can be conveniently attached to a wagon which will effectively head the cane and throw the heads into the wagon and operate in a simple manner.

The invention consists in certain details of construction and combination and arrangement of the parts, which I shall first describe and then particularly point out in the appended claims.

Reference is to be had to the accompanying drawings, forming part of this specification, in which like characters of reference indicate corresponding parts in all the views.

Figure 1 is a side view of my improvement mounted on a wagon. Fig. 2 is a detail view, partly in section, illustrating the locking and raising and lowering mechanism for the header-frame. Fig. 3 is an edge view thereof. Fig. 4 is a detail front view of the lower portion of the improvement. Fig. 5 is a rear view of the device attached to a wagon-bed, the latter being shown in section. Fig. 6 is a detail sectional side elevation of the slotted sleeve 47, the shaft 32, plug 48, and rod 50. Fig. 7 is a horizontal section taken on the line 7 7 of Fig. 6. Fig. 8 is a horizontal section taken on the line 8 8 of Fig. 1; and Fig. 9 is a section of the lower portion of the apparatus, taken on the line 9 9 of Fig. 5.

The support 10 for my improved cane-header consists of the upper and lower parallel beams 11 and 12, adjustably held together by bolts or other suitable means and arranged to extend across the wagon-bed, one above and the other below the same, the said beams being adjustably held together, as described above, for the purpose of fitting differently-sized wagon-beds. When in place, as shown in Fig. 5, the said support 10 extends some distance beyond the wagon on one side thereof. An upright 13 rises from the upper beam 11, near the extended end thereof, and at its upper end is provided with an outwardly-extending horizontal bearing-arm 14, formed with suitable guideways 15, and both beams 11 and 12 are formed with apertures 16 and 17, respectively, likewise forming guideways and in vertical alinement with the guideways 15.

The header-frame 18 is provided at its inner end with an upper pair of guides 19 and an oppositely-extending lower pair of guides 20, fitted to move in the guideways 15, 16, and 17, respectively, whereby the header-frame may be raised and lowered on the support 10 as desired. To accomplish this raising and lowering and to hold the header-frame at different elevations, I form the upper pair of guides with teeth 21, arranged to mesh with pinions 22 on a spindle 23, journaled in the end of the bearing-arm 14 and in a circular head 24, formed on the upper end of the upright 13. The said spindle 23 extends through the said head 24 and is there secured in a crank 25, having a handle 26 at its free end, a hand-grip 27 in the form of a sleeve being slidably fitted on said handle. A catch 28 is pivoted between its ends on the crank, with its rear end fitted in an elongated slot in the handle and normally passed outwardly by a spring 29, the forward end of such catch being thus normally held in engagement with one of a series of recesses 30 in the head 24. Now it will be seen that to raise or lower the header-frame 18 the operator presses the hand-grip inwardly on the handle, which frees the forward end of the catch 28 from engagement with the head 24, when the crank 25 can be turned to move the header-frame up and down in the guideways. The said header-frame is approximately rectangular and is formed with suitable bearings in its cross-bars 31, in which is fitted to rotate an operating-shaft 32, arched, preferably twice, between the said cross-bars 31.

Boxings 33 are fitted on the shaft at the head of each arch, and raking-fingers 34 are secured to said bearings, the said fingers being curved or hooked in advance of their points of attachment and being extended straight back from such curved portions, the rear extremities of the said fingers being hinged to the ends of a U-shaped rocking link 35, whose cross-bar is mounted to rock on the inner side bar 36 of the header-frame. By reason of this arrangement of the raking-fingers they are caused to have a raking motion as the shaft is rotated and are held to move in unison.

Between and on each side of the raking-fingers stripping-fingers 37 are fixedly held on the shaft 32, and below the lowermost stripping-finger a knife-carrier 38, in the form of a wheel or disk, is secured on the shaft, a knife 39 being attached to and extending out from said disk and is caused to pass between the members of a bifurcated stop or guard 40, supported from the lower cross-bar 31 of the header-frame. Beyond such stop and held in line with the axis of rotation of the shaft 32 by a suitable bracket 41 is an inner guard 42, which is formed with recesses 43 in its rear edge, whereby to allow for the passage of the raking-fingers when they are reciprocated, and a second and outer guard 44, preferably formed of rods, is held between its ends by a bracket 45, secured to the outer side bar of the header-frame 18, the rods of the said outer guard 44 extending in a curved direction from said bracket between and on both sides of the raking-fingers and being attached to the inner side bar of the header-frame. The two guards 42 and 44 form a pocket between them in which to gather the cane, and as the shaft is turned the raking-fingers grasp a certain number of the stalks, bringing them compactly together at the rear edge of the inner guard 42, at which point the knife 39 heads the cane and the stripping-fingers 37 throw the heads into the wagon.

I shall now describe the means whereby the operating-shaft 32 is rotated to effect the result described above.

The operating-shaft 32 extends down through its bearing in the lower cross-bar 31, through an aperture 46 in the outer end of the beam 11, and through a longitudinally split or slotted sleeve 47, held vertically in the lower beam 12, and it is square in cross-section from a point just below the bearing in the said lower cross-bar 31 of the header-frame to a point near its lower end, where it is made of circular form. A bearing-plug 48 is fitted to slide in the sleeve 47 and receives the lower circular end of the operating-shaft 32, the said plug having an extension 49 projecting through the longitudinal slot 50 to the outside of the sleeve, where it is securely attached to the lower end of a rod 51, which extends up through the cross-beams 12 and 11 and has its upper end secured to the lower cross-bar 31 of the header-frame. A horizontal shaft 52 is mounted to rotate between short posts 53, adjustably held between the cross-bars 11 and 12 of the supporting-frame 10. A bevel gear-wheel 54 is secured on the end of said shaft 52 and a bevel-pinion 55 formed with a sleeve 56, by which it is fitted in the upper end of the sleeve 47, and having a square opening, by which it is fitted to slide on, but compelled to turn with, the shaft 52. A sprocket-wheel 57 is loosely mounted on the shaft 52, being thrown into and out of operative engagement with the shaft by the clutch 58, and said sprocket-wheel is connected by a chain 59 with a similar though considerably larger sprocket-wheel 60 on the inner side of the hub of one of the rear wheels of the wagon.

In practical operation as the wagon is drawn forward motion is communicated to the shaft 52 and thence to the operating-shaft 32, which as it turns causes the raking-fingers 34 to grasp the stalks that have been gathered into the pocket between the guards 42 and 44, and as the raking-fingers move farther they bring such stalks compactly together against the bifurcated stop 40, when the knife heads the stalks and the stripping-fingers throw the heads into the wagon.

Should it be desired at any time to raise or lower the header-frame, owing to the different lengths of the stalks, it is accomplished by the crank 25, the operating-shaft being raised or lowered with the header-frame by means of the rod 51 and plug 48, such movement of the shaft having no effect on the pinion 55 for the reason that such pinion is slidably mounted on such shaft, so that the pinion is in operative engagement with the bevel gear-wheel 54, no matter at what elevation the shaft 32 is held.

Braces 61 and 62, having thumb-screws at their ends, serve, as shown, to assist in keeping the support 10 rigid on the wagon-bed, and the lower end of the split sleeve is provided with a brace 63.

If desired, a shelf 64, having bifurcated socket-irons, may be inserted on the side of the wagon-bed near the point where the heads are thrown by the stripping-fingers.

Having thus described my invention, what I claim as new, and desire to secure by Letters Patent, is—

1. In a device for the purpose described, a header-frame, a cranked shaft mounted therein, gathering-fingers pivotally mounted upon and operated by said shaft, and stripping-fingers fixedly secured on said shaft as set forth.

2. In a device for the purpose described, a header-frame, a cranked shaft mounted therein, gathering-fingers mounted upon the cranked portions of said shaft and having a hinged connection with the frame at their rear ends, stripping-fingers fixedly secured on said shaft, a revolving knife operated by said shaft, and a bifurcated stop on the frame in the path of the knife through which said knife passes as set forth.

3. In a device for the purpose described, a header-frame, an operating-shaft in said header-frame, a curved gathering-finger mounted on said shaft and moved thereby, stripping-fingers fixedly held on said shaft, a revolving knife carried by said shaft and located in line with the stripping-fingers, and a stop through which the knife passes, as set forth.

4. The combination with the support, of a header-frame, an arched operating-shaft journaled in said frame, raking-fingers mounted on the arches of said shaft and having a hinged connection with the frame, a knife-carrier fixed on said shaft and having a knife thereon, a bifurcated stop through which said knife passes, and stripping-fingers fixedly held on said shaft between and on each side of said raking-fingers, as set forth.

5. The combination with the support, of the header-frame movable up and down thereon, an operating-shaft for the heading devices and movable up and down with said frame, a sleeve on said support, said sleeve receiving the lower end of said shaft and provided with a longitudinal slot, a bearing-plug in said sleeve, the said plug forming a bearing for the lower end of said shaft and having an extension projecting through the slot in the sleeve to the outside thereof, a rod having one end secured to the extension of plug and its other end secured to the header-frame, and means for turning said shaft, as set forth.

WILLIAM DUDLEY EASLEY.

Witnesses:
ARTHUR VENTERS,
JIM TRICE.